April 10, 1945.   L. GRISWOLD   2,373,392
SLIDE HOLDER
Filed June 24, 1941
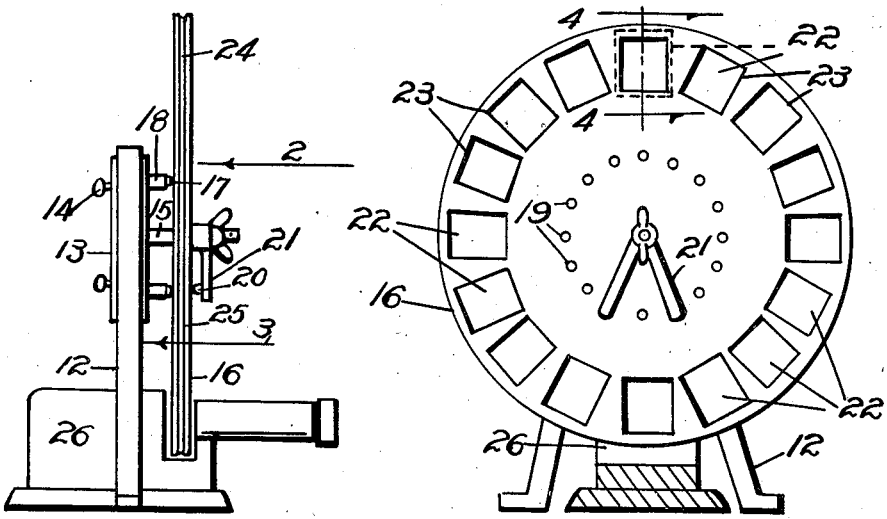
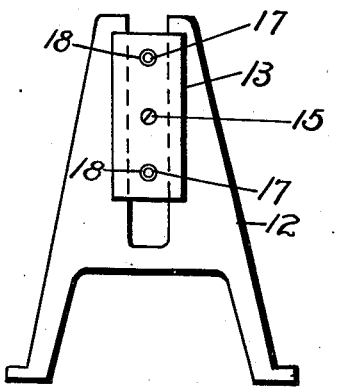
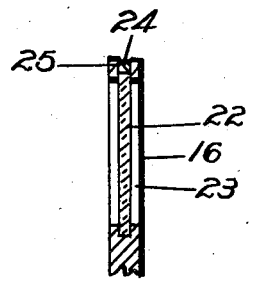
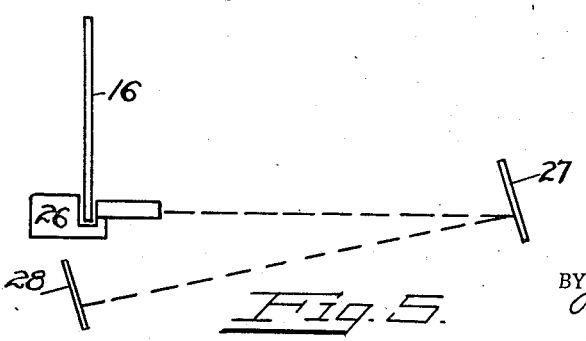
INVENTOR.
LESTER GRISWOLD
BY
Rollandet, McGrew & Campbell
ATTORNEYS.

Patented Apr. 10, 1945

2,373,392

UNITED STATES PATENT OFFICE 2,373,392

SLIDE HOLDER

Lester Griswold, Colorado Springs, Colo.

Application June 24, 1941, Serial No. 399,485

7 Claims. (Cl. 88—27)

This invention relates to improved holders for slides or the like, particularly transparencies that are intended to be projected upon a screen.

Ordinarily, such slides or transparencies are kept in racks or they may be merely stacked together, and usually they are inserted into or removed from the projector one at a time by hand. Such handling may result in scratching, fingerprinting or other damage to the slides, requires considerable attention to insert them in proper sequence, and makes it difficult to go back and review or reproject a particular slide. Furthermore, when slides are inserted into a projector singly, there may be some trouble in positioning the slide exactly right with reference to the projector.

Therefore, it is a general object of the present invention to provide a rotary slide holder in which slides, transparencies or the like intended for projection, may safely be placed and which reduces handling of slides and overcomes to a large extent the objections and difficulties hereinbefore set forth.

More particularly, an object of the present invention is to provide a rotary slide holder and support therefor that may be used to bring a series of slides or transparencies into projecting relationship with a projector in accurate relationship thereto.

Another object is to provide such an improved slide holder that may be used in combination with a projector to project slides, transparencies and the like, in predetermined sequence and which readily may be used to reverse the sequence or to refer back and re-project any given slide or subject matter.

A still further object is to provide an improved slide holder of this character in which the slides may readily be inserted and in which they are safely held and yet are readily removable.

Still another object is to provide an improved support for such a rotary slide holder that includes means for facilitating the positioning of the individual slides which are in the holder, accurately with reference to the projector, and which is adaptable for slide holders of this improved type that have different diameters.

Other objects and advantages reside in details of design and construction which will be more fully disclosed in the following description and in the drawing wherein like parts have been similarly designated and in which:

Figure 1 is a side elevation of a slide holder, support therefor and projector, that are constructed and arranged according to the present inventive concept;

Figure 2 is a front elevation partially in section, of the device illustrated in Figure 1 looking in the direction of arrow 2;

Figure 3 is an elevation of the support component of Figure 1 looking in the direction of arrow 3;

Figure 4 is a fragmentary sectional view taken along the line 4—4 of Figure 2 and drawn to a larger scale; and Figure 5 is a diagrammatic illustration showing the device illustrated in Figures 1 and 2 set up for short range projection.

In order to disclose an operative reduction to practice, of this invention, the accompanying drawing will be described in some particularity. However, the scope of the invention is measured by the appended claims.

In the drawing, reference character 12 denotes a support or A-frame, which carries a relatively vertically movable member 13 that can be held in selected positions with reference to the support by thumb set-screws 14.

A shaft 15 is mounted on the member 13 and a slide holder or disk 16 is rotatably positioned on said shaft.

A plurality of spring-urged friction buttons 17 are carried in tubular housings 18 that are mounted on member 13. The friction buttons 17 are positioned to bear against the slide holder or disk 16 and to engage in certain depressions or holes 19 therein, for the purpose of locating and holding the angular or rotary position of said disk and to assist in positioning the disk in its correct vertical plane.

Other friction buttons 20 are carried on a V-bracket or fork 21 that is non-rotatably mounted on the shaft 15 on the other side of the slide holder or disk 16. These buttons 20 cooperate in positioning and alining the disk 16, and it will be noted that a triangular arrangement of the friction buttons 17—20 is preferred for optimum positioning of disk 16.

Slides or transparencies 22 are positioned in spaced relationship in suitable frame-like openings 23 about the peripheral area of the holder 16. The slides are inserted radially into the openings 23 and an elastic band or the like 24 is placed in a peripheral groove 25, in the disk or holder 16, to retain the slides securely after they are in place. This arrangement provides for easy replacement or rearrangement of slides.

A projector indicated at 26 is positioned between the legs of the support or A-frame 12, to cooperate with the slide holder 16 which obviously, is rotated to bring the respective slides into projection relationship with said projector.

The slide holder 16 may be rotated by hand as desired, or it may be coordinated for automatic rotation, with sound reproduction apparatus. The various slides may be provided with adjacent reference characters, if desired, so that any of them readily may be located or referred back to.

Slides so mounted are freed, to a large extent, from the damage of handling, and they can be presented conveniently and accurately. The movable mounting 13 for the shaft 15, provides for disks or holders 16 of different diameters. The holders are readily interchangeable on the shaft 15.

The projection facilities and arrangements can be varied according to requirements. A powerful projector would be used for large or long-range work as in an auditorium, but for short-range projection, a less powerful projector and a mirror 27 shown in Figure 5, may be used to throw the image upon a screen or view-box 28. Various arrangements of projector, mirror and view-box may be made.

Thus is provided an improved slide holder and support that overcome the difficulties hereinbefore set forth and that fulfill the stated objects of the invention.

What I claim and desire to secure by Letters Patent is:

1. Apparatus of the character disclosed comprising a support, a slide holder having a peripheral groove and rotatably mounted on said support, there being radially open apertures in said holder for slides, and annular elastic means positioned about the periphery of said holder in the groove to retain slides therein.

2. Apparatus of the character disclosed comprising an A-frame, a slide holder having a peripheral groove and rotatably mounted on said A-frame, there being radially open apertures in said holder for slides, and annular elastic means positioned about the periphery of said holder in the groove to retain slides therein.

3. Apparatus of the character disclosed comprising a support, inclusive of a relatively vertically movable member, a slide holder having a peripheral groove and rotatably mounted on said movable member of the support, there being radially open apertures in said holder for slides, and annular elastic means positioned about the periphery of said holder in the groove to retain slides therein.

4. In apparatus of the character disclosed, the improvement which comprises a slide holder mounted for rotation, annular elastic means positioned about the periphery of the holder to retain slides therein, there being radially open frame-like apertures in the holder for the slides.

5. Slide-holding apparatus comprising a frame; a shaft extending from said frame; a disc centrally journalled on said shaft and having a plurality of slide-holding openings around the periphery thereof, said disc also having a series of apertures in annular relationship to said shaft; a friction element supported from said frame and adapted to engage an aperture on one side of said disc; and a fork on the opposite side of said disc and having two arms provided with friction elements adapted to engage apertures disposed on opposite sides of a radius through the aperture engaged by said first-mentioned friction element.

6. Slide-holding apparatus comprising a frame; a shaft extending horizontally therefrom; a disc centrally journalled on said shaft and having a plurality of slide-holding openings disposed about the periphery thereof, said disc also having a series of depressions disposed in annular relationship and coinciding in radial position on opposite sides of said disc; a friction element engaging a depression on one side of said disc and below said shaft; a fork non-rotatably mounted on said shaft on the side opposite said friction element and having a pair of arms provided with friction elements adapted to engage depressions on opposite sides of a radius of said disc extending through the depression engaged by said first-mentioned friction element; and an additional friction element adapted to engage a depression on the same side of said disc as said first-mentioned friction element but above said shaft.

7. Slide-holding apparatus as defined in claim 6, in which said first-mentioned friction element engages a depression directly beneath said shaft and said last-mentioned friction element engages a depression directly above said shaft.

LESTER GRISWOLD.